United States Patent [19]

Kuramochi et al.

[11] 4,455,890
[45] Jun. 26, 1984

[54] OVERDRIVE DEVICE FOR AUTOMATIC TRANSMISSIONS

[75] Inventors: Koujiro Kuramochi; Kazuaki Watanabe; Yukio Terakura, all of Aichi, Japan

[73] Assignee: Toyota Jidosha Kogyo Kabushiki Kaisha, Aichiken, Japan

[21] Appl. No.: 189,359

[22] Filed: Sep. 22, 1980

Related U.S. Application Data

[63] Continuation-in-part of Ser. No. 133,826, Mar. 25, 1980, abandoned, which is a continuation of Ser. No. 818,852, Jul. 25, 1977, abandoned.

[30] Foreign Application Priority Data

Apr. 5, 1977 [JP] Japan .................. 52-38146

[51] Int. Cl.³ ............................. F16H 57/10
[52] U.S. Cl. .......................... 74/783; 74/763; 74/767
[58] Field of Search ............. 74/740, 758, 759, 762, 74/763, 766, 767, 770, 640, 730, 781 R, 782, 783; 192/41 A, 45

[56] References Cited

U.S. PATENT DOCUMENTS

| | | | |
|---|---|---|---|
| 2,247,713 | 7/1941 | Peterson et al. | 192/45 |
| 2,382,331 | 8/1945 | Peterson et al. | 192/45 |
| 3,014,567 | 12/1961 | Stockton | 192/45 |
| 3,230,796 | 1/1966 | Thomson | 74/781 R |
| 3,487,726 | 1/1970 | Burnett | 74/781 R |
| 4,034,628 | 7/1977 | Sakai et al. | 74/869 |
| 4,043,223 | 8/1977 | Ohnuma et al. | 74/781 R |
| 4,056,990 | 11/1977 | Hatano | 74/781 R |
| 4,098,148 | 7/1978 | Wayman | 74/781 R |
| 4,114,478 | 9/1978 | Clauss | 74/781 R |

FOREIGN PATENT DOCUMENTS 714019 8/1954 United Kingdom ........ 74/763

Primary Examiner—Allan D. Herrmann
Assistant Examiner—Joseph M. Rolnicki
Attorney, Agent, or Firm—Toren, McGeady and Stanger

[57] ABSTRACT

An overdrive device for motor vehicle transmissions includes a sun gear, planet pinions and a ring gear in meshing relationship. A one-way clutch having an inner race integrally secured to the sun gear is provided with the outer race of the one-way clutch being spline-coupled to a carrier which rotatably supports the planet pinions. A certain degree of slack or looseness is provided between the carrier and the outer race to permit some relative movement therebetween in the radial direction of the overdrive device.

12 Claims, 4 Drawing Figures

OVERDRIVE DEVICE FOR AUTOMATIC TRANSMISSIONS

This application is a continuation-in-part of application Ser. No. 133,826 filed Mar. 25, 1980, now abandoned, which is, in turn a continuation of application Ser. No. 818,852 filed July 25, 1977, now abandoned.

The present invention relates to an overdrive device for use in an automatic transmission in a motor vehicle, which device automatically controls the torque to be transmitted from an engine to the drive wheels of the vehicle.

Overdrive devices for establishing a reduction gear ratio of less than 1 are equipped in automatic transmissions for reducing noise of the engine during operation at high speed, and to improve fuel consumption. An overdrive device of this type includes a sun gear, planet pinions, and a ring gear, and directly operably couples an input shaft to an output shaft by bringing two of three gears of the above type into mesh with each other, except when the transmission is in gear positions other than an overdrive gear position. For this purpose, a one-way clutch is used.

There are two alternatives for positioning such a one-way clutch. One position is between an input shaft and an output shaft, wherein relative rpm between two gear types is minimized upon overdrive, and wherein easy centering of gears results. However, in this case, the torque capacity required for the one-way clutch becomes equal to the input torque, and the length of the overdrive device must be increased in the axial direction.

The other position is between an input shaft and a shaft which is fixed during overdrive operation. In this case, the torque capacity required for the one-way clutch is calculated as the input torque multiplied by the number of teeth of the sun gear divided by the number of teeth of the ring gear. Thus, the torque capacity may be reduced while permitting a reduction in the size of the overdrive device. In such a case, however, the difference in rpm between input shaft and the fixed shaft becomes equal to the input rpm, thus resulting in an increase in the wear of race surfaces in the one-way clutch. In addition, the input shaft and fixed shaft would be shifted in the axial and radial directions due to error in the meshing condition of planet pinions and dimensional errors in respective gears, so that the operability and durability of the one-way clutch are adversely affected.

The present invention is intended to provide an overdrive device for use in an automatic transmission in a motor vehicle wherein the one-way clutch is positioned between an input shaft and a shaft to be fixed during overdrive operation, which avoids the aforementioned adverse effects upon the operability and durability of the one-way clutch.

The overdrive device of the invention is directed toward reduction of the entire size of the automatic transmission by positioning the overdrive device between a fluid-coupling type torque converter and two or more auxiliary transmissions each having one or more reduction gear ratios.

SUMMARY OF THE INVENTION

The present invention may be briefly described as an overdrive device for an automatic transmission in a motor vehicle comprising a planetary gear assembly which includes a sun gear, planet pinions and a ring gear in meshing relation. A one-way clutch is provided which includes an inner race which is integrally secured to the sun gear, and an outer race which is spline-coupled to a carrier which rotatably supports the planet pinions. A certain slack or looseness is provided between the carrier and the outer race in the radial direction of the overdrive device to permit some relative movement therebetween.

The various features of novelty which characterize the invention are pointed out with particularity in the claims annexed to and forming apart of this disclosure. For a better understanding of the invention, its operating advantages and specific objects attained by its use, reference should be had to the accompanying drawings and descriptive matter in which there is illustrated and described a preferred embodiment of the invention.

DESCRIPTION OF THE PREFERRED EMBODIMENTS

Figure 1:
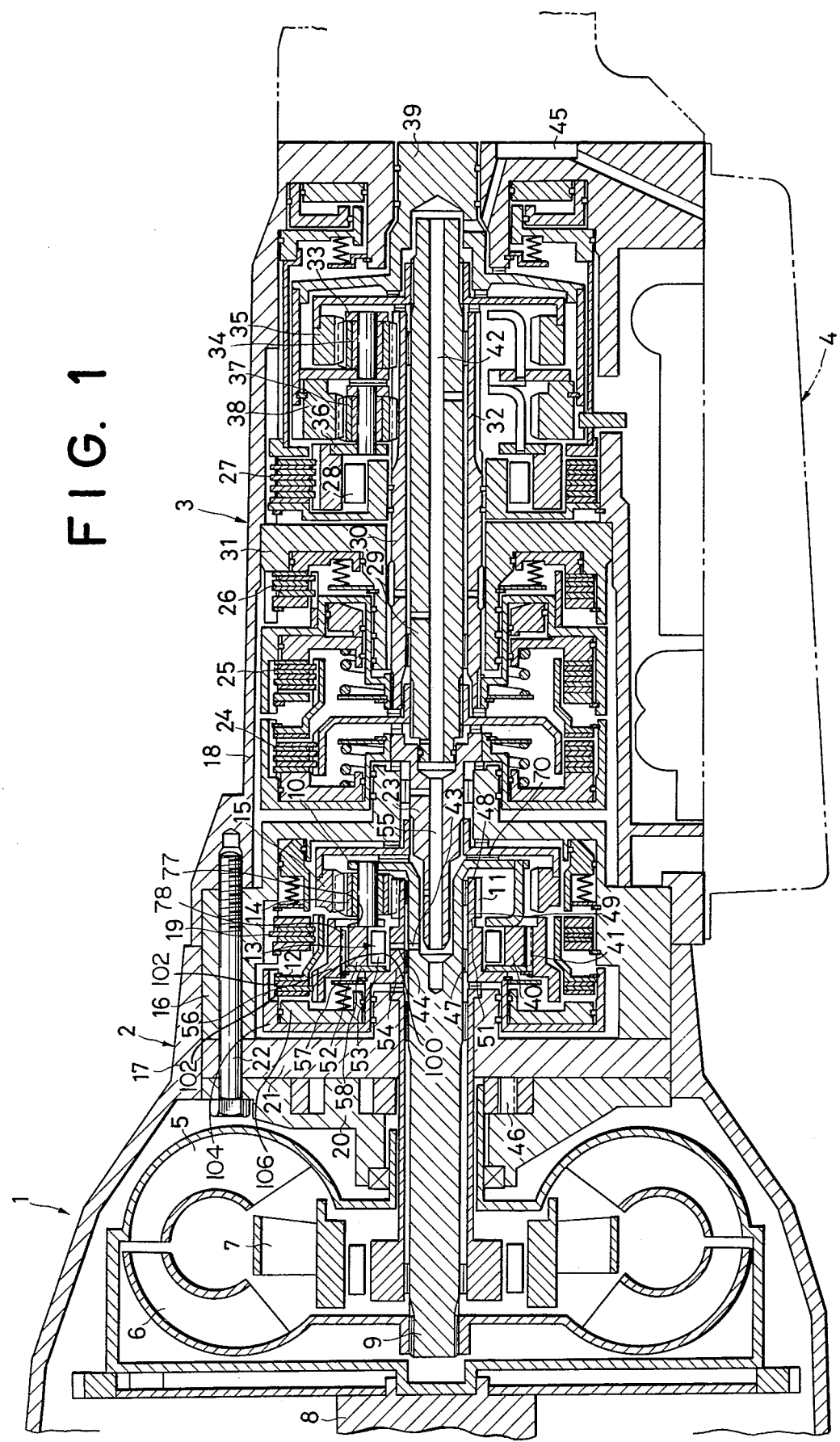
FIG. 1 is a longitudinal cross-sectional view of an automatic transmission having an overdrive device according to the present invention.
Figure 2:
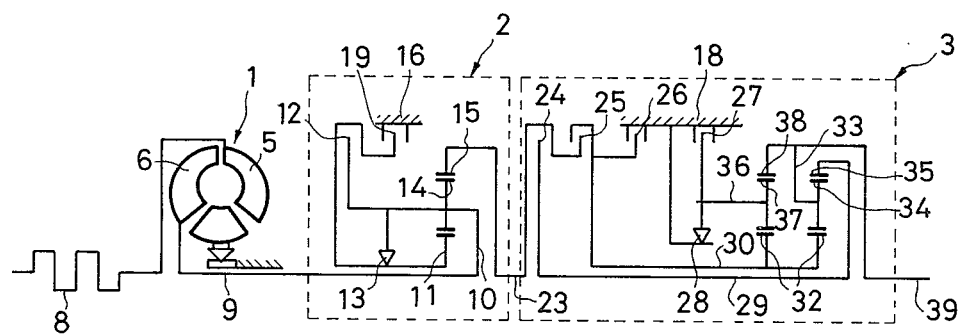
FIG. 2 is a schematic diagram showing the relationship among components of the Automatic transmission of FIG. 1.

Referring to FIGS. 1 and 2, the automatic transmission includes a torque converter 1, overdrive device 2, three-forward-speed and one-reverse auxiliary transmission 3, and a hydraulic control portion 4. The torque converter 1 is of a known type, in which there are provided a pump 5, turbine 6 and stator 7. The pump 5 is coupled to a crank shaft 8 of an engine (not shown), while the turbine 6 is coupled to a turbine shaft 9. The turbine shaft 9 serves as an output shaft for the torque converter 1, as well as an input shaft for the overdrive device 2, being coupled to a carrier 10 in a planetary gear device in the overdrive device.

Planet pinions 14 are rotatably supported by the carrier 10 and mesh with a sun gear 11 and a ring gear 15. A sun gear 11 is fitted on a sun gear shaft 51 which is supported by a turbine shaft 9 through the medium of two bearings 47, 48 in coaxial relationship. The turbine shaft 9 serves as an input shaft for the overdrive device.

A hub 56 is integrally secured to the carrier 10, and spline-coupled to a disc in a multiple disc clutch 12 at one end of the hub. In the clutch 12, which is provided in parallel to a one-way clutch 13, a piston 106 is fitted into a cylinder drum 104 so that they operate as a servo device for pressing plates 102 and discs 100 on each other by the circumference of the piston 106. The cylinder drum 104 extends on the fluid torque converter side of the one-way clutch 13. The discs 100 and the plates 102 of the clutch 12 are positioned radially outside of the clutch 13 and since the discs and plates of the clutch 12 and the one-way clutch 13 are located in different positions in the radial direction thereby enabling the distance between the one-way clutch and the cylinder drum to be decreased, the axial size of the overdrive unit is reduced. A plate in the multiple disc clutch 12 is coupled to the sun gear shaft 51, thereby controlling the selective engagement of the sun gear shaft 51 with the hub 56 i.e., carrier 10. In addition, the one-way clutch 13 is provided between the hub 56 and the sun gear shaft 51. The one-way clutch 13 includes an outer race 52, sprag 53 and inner race 54.

Figure 4:
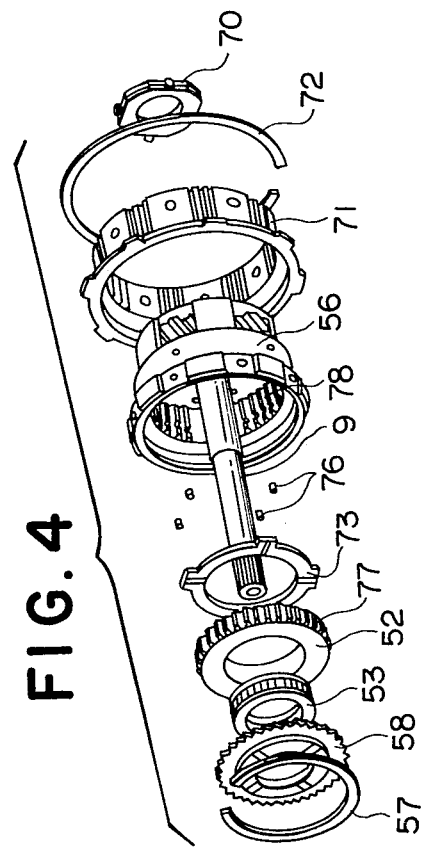
FIG. 4 is an exploded view showing in greater detail the spline coupling of the invention.

As best seen in FIG. 4, spline means in the form of a plurality of key grooves 77, 78 extending in the axial direction are defined in the radially outer peripheral surface of the outer race 52 and in the radially inner peripheral surface of the hub 56, with the key grooves 77 of the outer race 52 being interfitted with the key grooves 78 of the hub 56. A certain degree of slack or looseness in the radial direction is provided between the key grooves 77, 78 of the spline means. Accordingly, the outer race 52 is movable a given distance both in the axial direction and in the radial direction.

A snap ring 57 is provided for the hub 56 integral with the carrier 10 for bearing a thrust acting on the one-way clutch 13, while a thurst washer 58 spline coupled to the hub of the one-way clutch is provided between the snap ring 57 and the outer race 52, with a thrust washer 73 being provided on the opposite side of the one-way clutch.

The inner race 54 is secured to the sun gear shaft 51. A multiple disc brake 19 is provided between the sun gear 11 and a housing or overdrive casing 16 containing the overdrive device therein.

A washer 70 is provided between a flanged end of the turbine shaft 9 and the radially extending member secured integrally to the ring gear 15. A hub 71 has a splined outer surface which is engaged by plates of the brake 19 and is supported by a snap ring 72.

The torque converter 1 includes a housing 17 which contains the pump 5, turbine 6, stator 7 and the like therein. The auxiliary transmission 3 includes a housing or transmission casing 18 which contains a planetary gear mechanism, clutch and brake. The housing 17 and casing 18 are fastened together by means of bolts (not shown). The overdrive casing 16 is fastened to the transmission casing 18 by means of bolts 22, together with a housing containing an oil pump gear, or oil pump bodies 20, 21.

A multiple disc clutch 24 is provided between the input shaft 23 and an intermediate shaft 29, while a multiple disc clutch 25 is provided between the input shaft 23 and a sun gear shaft 30. A multiple disc brake 26 is provided between the sun gear shaft 30 and a support 31 to the transmission casing 18. The sun gear 32 fitted on the sun gear shaft 30 forms a two-row planetary gear device by the cooperation between a group including a carrier 33, planet pinions 34 carried by the carrier 33, and ring gear 35 meshing with the pinions 34, and another group including a carrier 36, planet pinions 37 carried by the carrier 36, and a ring gear 38 meshing with the pinions 37. The ring gear 35 in one planetary gear device is coupled to an intermediate shaft 29. The carrier 33 in said one planetary gear device is coupled to the ring gear 38 in the other planetary gear device, while the carriers and ring gear are coupled to the output shaft 39. In addition, a multiple disc brake 27 and a one-way clutch 28 are provided between the carrier 36 and the transmission casing 18 in the other planetary gear device.

A hydraulic control device 4 is positioned under the auxiliary transmission 3 for effecting engagement or release of respective clutches and brakes by actuating change-over valves in the hydraulic control device, in response to vehicle speed and engine output, thus establishing four forward speed gear positions including overdrive (O.D.), or one reverse obtained by manual operation.

Table 1 shows the change gear positions, and operation of the clutches and brakes.

TABLE 1

| | | | friction-engaging device | | | | | | |
|---|---|---|---|---|---|---|---|---|---|
| shift position | | | clutch 12 | clutch 24 | clutch 25 | brake 19 | brake 26 | brake 27 | one-way clutch 13 | one-way clutch 28 |
| parking | | | O | X | X | X | X | O | | |
| reverse | | | O | X | O | X | X | O | lock | unlock |
| neutral | | | O | X | X | X | X | X | | |
| forward | D-range | 1st | O | O | X | X | X | X | lock | lock |
| speed | | 2nd | O | O | X | X | O | X | lock | overrun |
| transmission | | 3rd | O | O | O | X | X | X | lock | overrun |
| position | | O.d. | X | O | O | O | X | X | overrun | overrun |
| | 2-range | 1st | O | O | X | X | X | X | lock | lock |
| | | 2nd | O | O | O | X | O | X | lock | overrun |
| | L-range | | O | O | X | X | X | O | lock | lock |

(Note: O represents an engaging condition of a clutch or a brake and X represents a released condition thereof.)

An oil passage 45 is provided within the transmission casing 18 in the auxiliary transmission 3. Another oil passage 42 runs through the intermediate shaft 29 and communicates with the oil passage 45. An oil passage 55 runs through the input shaft 23 in communication with the oil passage 42. Thus, lubricating oil is pumped up and pressurized by an oil pump gear built in oil pump bodies 20, 21, then adjusted for a given pressure in the hydraulic control portion 4, and supplied through oil passages 45, 42 and 55 to respective portions of the overdrive device 2 and auxiliary transmission 3.

Specific oil passages are provided for the lubrication and cooling of the one-way clutch 13. An oil chamber 49 is defined by the turbine shaft 9, sun gear shaft 51 and bearings 47, 48, and communicated through a hole 43 provided through the turbine shaft 9 with an oil passage 55. An oil passage 44 running through the sun gear shaft 51 is communicated at its one end with the inner race 54 in the one-way clutch 13, and at the other end with the oil chamber 49. Thus, lubricating oil may be supplied at a given pressure through the oil passage 55, then through oil chamber 49, and oil passage 44 to the one-way clutch 13, for lubricating and cooling the outer race 52 and inner race 54.

Figure 3:
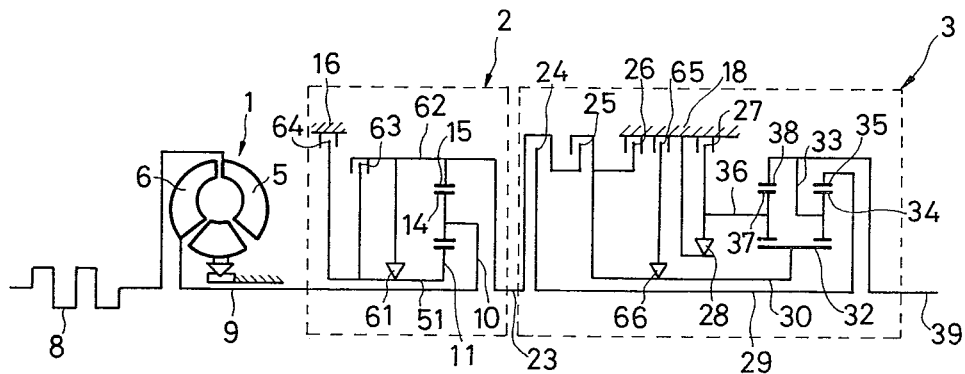
FIG. 3 is a schematic diagram showing another embodiment of the automatic transmission having an overdrive device according to the present invention.

FIG. 3 shows an automatic transmission different from that shown in FIG. 1. Like parts are designated with like reference numerals for common use. A one-way clutch 61 in the overdrive device 2 is provided between a drum integral with the ring gear 15, and the sun gear shaft 51. In addition, a clutch 63 is provided in parallel with the one-way clutch 61 but between the sun gear shaft 51 and the drum 62. A brake 64 is provided between the sun gear shaft 51 and the overdrive casing 16. On the other hand, in the auxiliary transmission 3, series connection of the brake 65 and the one-way clutch 66 is provided between the sun gear shaft 30 and the transmission casing 18.

Table 2 shows the relationship between the change gear positions and operational conditions of respective clutches and brakes.

TABLE 2

| shift position | | 63 | 24 | 25 | 64 | 26 | 27 | 61 | 28 | 66 | 65 |
|---|---|---|---|---|---|---|---|---|---|---|---|
| | P | O | X | X | X | X | O | | | | X |
| | R | O | X | O | X | X | O | lock | lock | overrun | X |
| | N | O | X | X | X | X | X | | | | X |
| D | 1st speed | O | O | X | X | X | X | lock | lock | lock* | X |
| | 2nd speed | O | O | X | X | O | X | lock | overrun | lock | O |
| | 3rd speed | O | O | O | X | X | X | lock | overrun | overrun | O |
| | OD | X | O | O | O | X | X | overrun | overrun | overrun | O |
| 2 | 1st speed | O | O | X | X | X | X | lock | lock | lock* | X |
| | 2nd speed | O | O | X | X | O | X | lock | overrun | lock | O |
| | L | O | O | X | X | X | O | lock | lock | overrun | X |

*Power is not transmitted. Symbols are used commonly with those given in Table 1.

In the embodiment shown in FIG. 3, the one-way clutch 61 includes an outer race, sprag, and inner race as in the one-way clutch 13 in FIG. 1. A plurality of key grooves are provided in the radially outer peripheral surface of the outer race of the one-way clutch 61, while grooves are provided in the inner peripheral surface of the drum 62 and loosely interfitted with the key groove of the outer race in the one-way clutch 61. Accordingly, the outer race of one-way clutch 61 may be displaced a distance relative to the drum in the axial and radial directions. The inner race of one-way clutch 61 is secured to the sun gear shaft 51.

As is apparent from the foregoing description, the outer race in the one-way clutch is spline-coupled to the carrier or the annular drum, with some allowance being provided therebetween in the radial direction. Accordingly, the outer race may suitably accommodate itself to axial misalignment due to dimensional error in the manufacture, or error in the assembly operation thereof, so that generation of heat accruing therefrom may be suppressed, while the operability and durability of the one-way clutch is improved.

In addition, lubricating oil is directly supplied to the one-way clutch at a given pressure, so that the surfaces of the outer race 52 and inner race 54 may be effectively cooled and oil films may be formed on the aforesaid surfaces, thereby preventing wear of the outer race and inner race, with a resulting longer service life of the one-way clutch 13.

Furthermore, the overdrive device is positioned between the fluid-coupling type torque converter and two or more auxiliary transmissions each having one or more reduction gear ratios, thereby reducing the entire size of the automatic transmission.

While a specific embodiment of the invention has been shown and described in detail to illustrate the application of the inventive principles, it will be understood that the invention may be embodied otherwise without departing from such principles.

What is claimed is:

1. In an automatic transmission assembly for a motor vehicle including
   an overdrive device having an axis of rotation and defining a radial direction,
   an input shaft for said overdrive device,
   a planetary gear assembly including a sun gear, a ring gear, planet pinions and a carrier rotatably supporting said planet pinions, said carrier being connected with said input shaft, and
   a one-way clutch for selectively coupling said sun gear with said carrier, said one-way clutch including an outer race and an inner race, with said inner race being affixed with said sun gear,
   the improvement comprising that a splined coupling is provided between said outer race of said one-way clutch and said carrier to operatively couple said carrier and said outer race, said splined coupling being structured to enable a predetermined degree of relative movement particularly in the radial direction of said overdrive device between said carrier and said outer race.

2. An assembly according to claim 1 wherein said inner race of said one-way clutch is formed integrally with said sun gear.

3. An assembly according to claim 1 further comprising an output shaft coupled to said ring gear, brake means for braking said sun gear, and a hub integrally coupled with said carrier, said outer race of said one-way clutch being coupled by said splined coupling with said hub.

4. An overdrive device according to claim 3 further comprising a snap ring provided on one of said carrier and said hub, and a thrust washer provided between said outer race of said one-way clutch and said snap ring for supporting said outer race, said thrust washer being spline coupled to said hub of said one-away clutch.

5. An assembly according to claim 1 wherein said outer race comprises a radially outer surface, wherein said carrier comprises a radially inner surface, and wherein said splined coupling comprises key grooves defined in the radially outer surface of said outer race, and key grooves defined in the radially inner surface of said carrier, said key grooves being arranged in engagement with each other to establish said splined coupling between said outer surface of said outer race and said inner surface of said carrier.

6. An assembly according to claim 1 including a fluid-coupling type torque converter and a plurality of auxiliary transmissions each having one or more reduction gear ratios, wherein said overdrive device is positioned between said torque converter and said plurality of auxiliary transmissions.

7. Automatic transmission comprising:
   a torque converter including a turbine;
   an overdrive unit including a single planetary gear device and provided adjacent to said torque converter coaxially therewith; and an auxiliary transmission including a plurality of planetary gear devices adapted to attain plural gear ratios and provided adjacent to said overdrive unit coaxially therewith;

said overdrive unit including an input shaft connected to said turbine of said torque converter; said planetary gear device including a carrier connected to said input shaft, planet pinions rotatably supported by said carrier, a ring gear and a sun gear which mesh with said planet pinions; a one-way clutch positioned on the torque converter side of said planetary gear device between said carrier and said sun gear, so as to allow a relative rotation in one direction alone, of said carrier and said sun gear; an overdrive clutch including a cylinder drum having a portion radially extending on the torque converter side of said one-way clutch, and a portion connected to said sun gear, and controlling connection between said sun gear and said carrier; and an overdrive brake provided radially outwardly of said planetary gear device and controlling connection between said cylinder drum and a housing of said overdrive unit; said ring gear of said planetary gear device of said overdrive unit having a portion connected by spline means to the input shaft of said auxiliary transmission.

8. An automatic transmission as defined in claim 7 wherein said overdrive clutch and said overdrive brake of said overdrive unit include a frictional engaging device consisting of a plurality of plates and discs, a piston adapted to press said frictional engaging device, and a servo device for operating said piston when oil pressure is supplied thereto.

9. An automatic transmission as defined in claim 7 wherein said one-way clutch of said overdrive unit includes inner race means, outer race means and sprags disposed between said inner race means and said outer race means; at least one of said inner race means and said outer race means being connected by spline means to said carrier with the other being connected to said sun gear.

10. An automatic transmission as defined in claim 7 wherein the input shaft of said overdrive unit and the input shaft of said auxiliary transmission are axially overlapped with each other.

11. An automatic transmission as defined in claim 9 wherein said ring gear of said planetary gear device of said overdrive unit has an inner circumferential gear portion and a flange portion extending radially from said gear portion on the auxiliary transmission side of said planetary gear device and connected by spline means to the input shaft of said auxiliary transmission; and wherein a bearing means is interposed between said flange portion and said carrier.

12. An automatic transmission as defined in claim 8, 9, 10, or 11 wherein said auxiliary transmission comprises:
   a first planetary gear device;
   a second planetary gear device including a carrier connected to a ring gear of said first planetary gear device;
   a sun gear shaft on which the sun gears of said first and second planetary gear devices are integrally formed;
   a first clutch for controlling connection between said input shaft of said auxiliary transmission and said ring gear of said second planetary gear device;
   a second clutch for controlling connection between the input shaft and the sun gear shaft of said auxiliary transmission;
   a first brake for controlling connection between the sun gear shaft and the housing of the auxiliary transmission;
   a second brake for controlling connection between the carrier of said first planetary gear device and the housing of said auxiliary transmission; and
   an output shaft provided coaxially with said input shaft of said auxiliary transmission and connected to the carrier of said second planetary gear device.

* * * * *